Dec. 9, 1941.    A. F. KLASING    2,265,376
HAND BRAKE MECHANISM
Filed Oct. 12, 1939    2 Sheets-Sheet 1

Inventor
Augustus F. Klasing,
By Wolhaupter & Groff
Attorneys

Dec. 9, 1941.   A. F. KLASING   2,265,376
HAND BRAKE MECHANISM
Filed Oct. 12, 1939   2 Sheets-Sheet 2
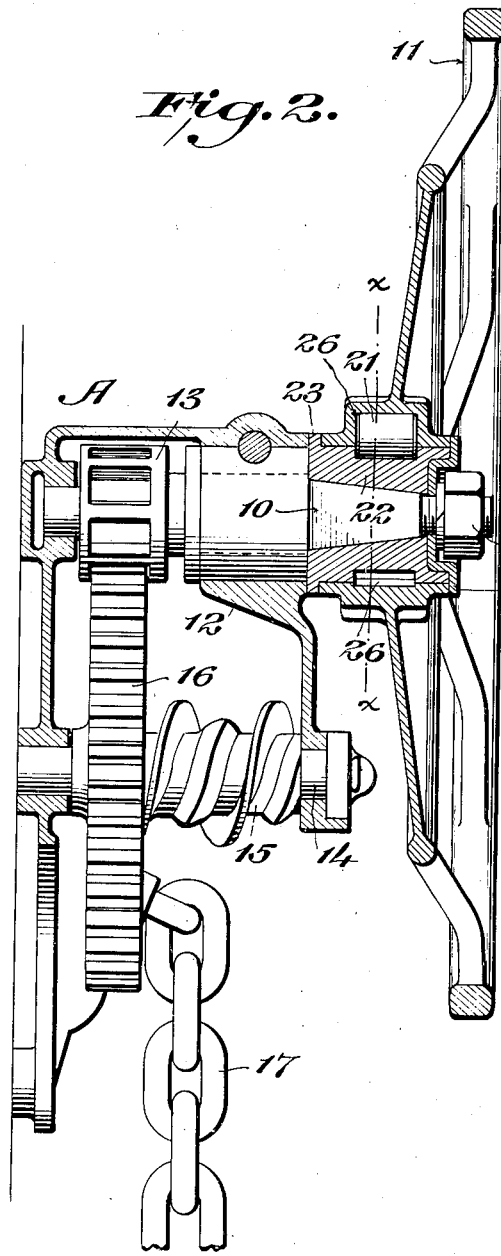
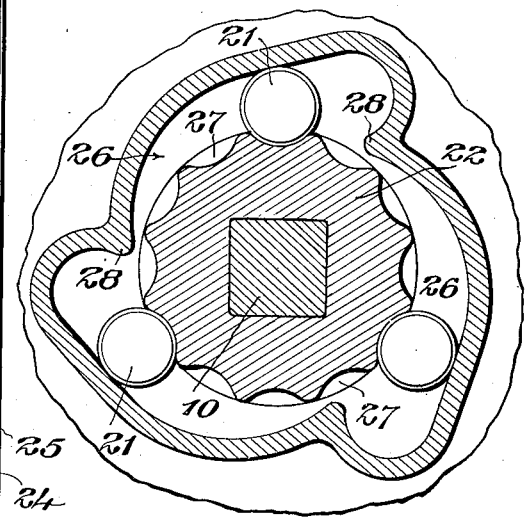
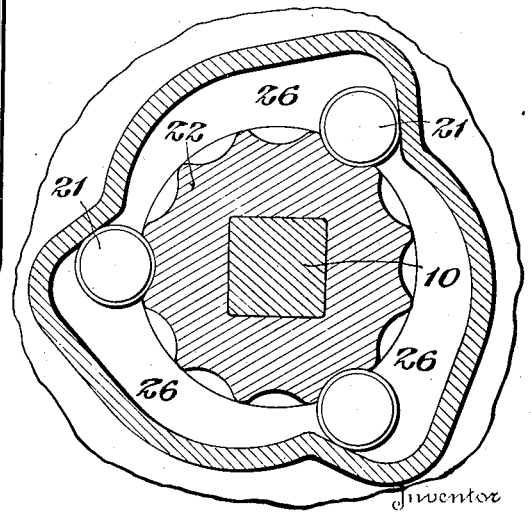
Inventor
Augustus F. Klasing,
By Wolhaupter & Groff
Attorneys Patented Dec. 9, 1941

2,265,376

UNITED STATES PATENT OFFICE 2,265,376

HAND BRAKE MECHANISM

Augustus F. Klasing, St. Petersburg, Fla.

Application October 12, 1939, Serial No. 299,218

1 Claim. (Cl. 74—505)

This invention relates to hand brake mechanisms for railway cars, and has generally in view to provide a hand brake mechanism in which damaging shocks and strains are very materially reduced as compared with the damaging shocks and strains to which known hand brake mechanisms are subjected in service.

A hand brake mechanism of the type with which the present invention is concerned comprising a chain drum and a hand-wheel shaft geared together so that by rotation of the hand-wheel shaft in one direction the chain drum is rotated to wind thereover a chain which is connected with the brake levers, thereby to apply the brakes. Usually a pawl cooperates with a gear or ratchet wheel in the brake mechanism to hold the chain drum against chain unwinding rotation, said pawl being manually released when it is desired to release the brakes.

In hand brake mechanisms of the type mentioned and as heretofore constructed, the usual hand-wheel for rotating the hand-wheel shaft is fixed on said shaft. When, therefore, the brakes are applied and the pawl is released, the brake applying energy stored in the mechanism is transmitted to the hand-wheel shaft and the hand-wheel fixed thereto and results in more or less rapid spinning of these parts. This spinning, if permitted to continue, results in complete chain unwinding rotation of the chain drum. Often a trainman wishes to effect a partial release of the brakes and to do this, it is common practice, after release of the pawl, to again engage same to stop chain unwinding rotation of the chain drum following release of the brakes, but before the hand wheel has ceased spinning. A hand-wheel has considerable mass and when rotated possesses considerable energy. The pawl, when thus re-engaged, acts instantly to stop rotation of the hand-wheel. It follows, therefore, that when the pawl is engaged during release rotation of the hand-wheel the whole mechanism is subjected to more or less shock and strain and possibly breakage, depending upon the rapidity of rotation of the hand-wheel at the time the pawl is engaged.

According to the present invention the hand-wheel is not secured fast to the hand-wheel shaft. On the contrary, there is a connection between the hand-wheel and its shaft such that the shaft is required to rotate with the hand-wheel when the hand-wheel is rotated in a direction to apply the brakes, and such that the hand-wheel will overrun the hand-wheel shaft and continue to spin if the shaft is suddenly stopped as a consequence of re-engaging the pawl during release rotation of the brake. Thus, when the pawl is engaged following release of the brakes, it is not required to absorb the energy of a rotating hand-wheel and as a consequence shocks and strains on the mechanism and the possibility of breakage of parts thereof is prevented.

Other important advantages of a connection as stated between a hand-wheel and its shaft are that the hand-wheel may be oscillated not only to tighten the brakes, but to subject the mechanism to impact to free the pawl for release when the brakes are applied.

The invention consists in the novel features of construction, combination and arrangement of parts as will be hereinafter more fully described, illustrated in the accompanying drawings and defined in the appended claim.

In the accompanying drawings, wherein like characters of reference denote corresponding parts in related views:

Figure 2 is a vertical section through the mechanism shown in Fig. 1.

Figure 3 is a section at right angles to Fig. 2 on line x—x, and

Figure 4 is a view similar to Fig. 3 illustrating an alternative form of the invention.

Figure 1:
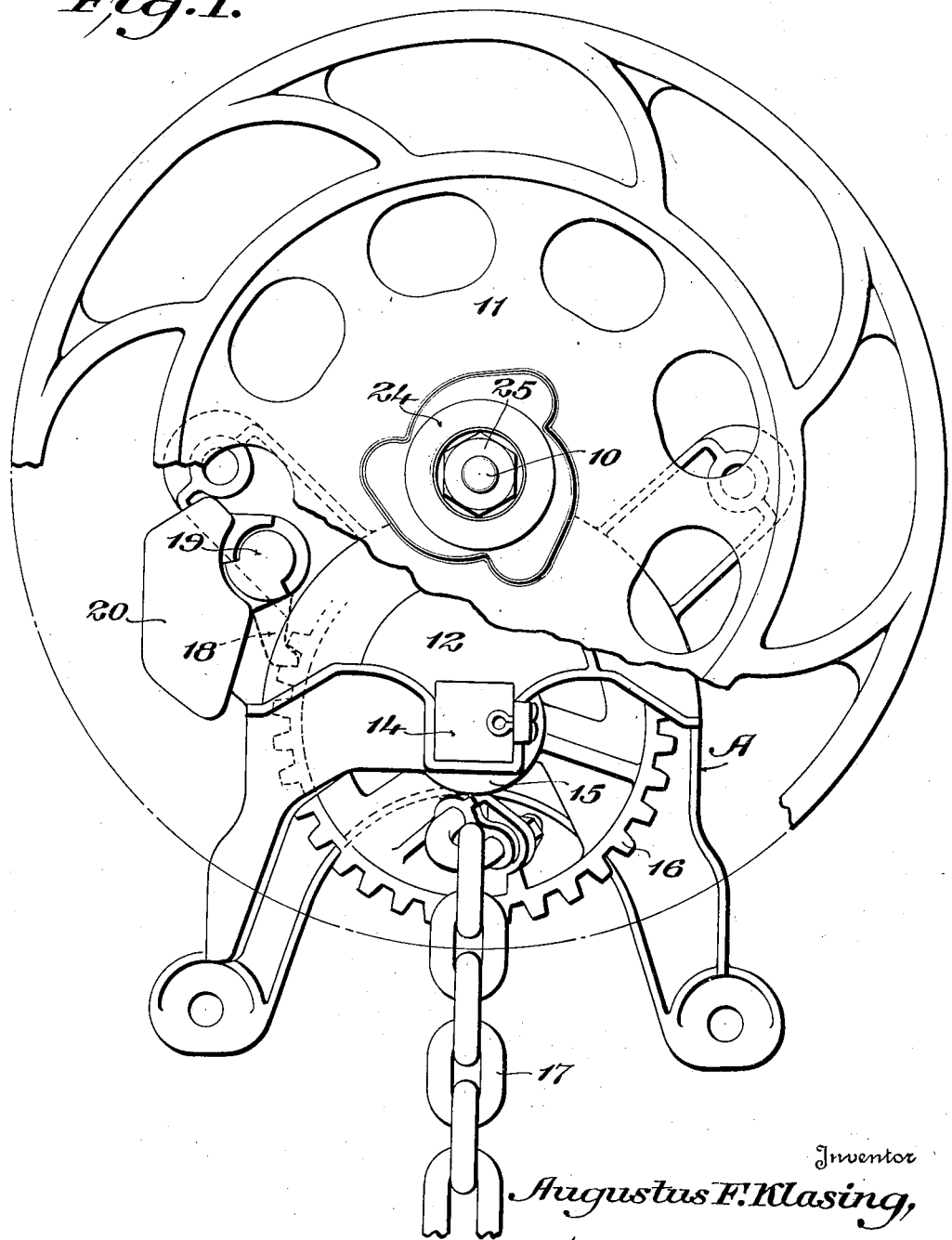
Figure 1 is a front elevation of a well known type of hand brake mechanism embodying one practical form of the invention, the hand wheel being partly broken away.

Referring to the drawings in detail, A designates, generally, a hand brake mechanism of a known type including, as elements with which the present invention is particularly concerned, a hand-wheel shaft 10 and a hand-wheel 11.

The shaft 10 is journaled in a casing 12 and carries a pinion 13. Below said shaft 10 the casing 12 has mounted therein a shaft 14 on which is rotatably mounted a chain drum unit including a chain drum 15 and a gear wheel 16 in mesh with the pinion 13. Accordingly, the shaft 10 is rotatable in one direction to rotate the gear wheel 16 and the chain drum 15 to wind a chain 17 onto said drum 15 to apply the brakes, and is rotatable in the opposite direction by unwinding of the chain drum. To hold the mechanism against unwinding rotation during application of the brakes and as long as it may be desired to maintain the brakes applied, there is provided a pawl 18 for cooperation with the gear wheel 16, said pawl being mounted on a rock-shaft 19 journaled in the casing 12 and being equipped with a weighted handle 20 whereby it may be swung to and be maintained in operative and inoperative positions relative to the gear wheel 16. When, following application of the brakes, the pawl 18 is released, the energy stored in the mechanism is transmitted to the shaft 10 and results in more or less rapid rotation thereof, and will result in more or less rapid rotation of the hand-wheel 11. However, in accordance with the present invention, the hand-wheel 11 is not fixed to the shaft 10 but is connected thereto by suitable means so that when the shaft 10 is held from rotation in release direction, the wheel may be rotated in release direction, and so that it is effective, when rotated in a direction corresponding to brake applying rotation of the shaft 10, to positively rotate said shaft. Thus, when the pawl 18 has been released to release the brakes and when, during unwinding rotation of the chain drum and consequent spinning of the shaft 10, the pawl 18 is re-engaged to stop complete unwinding of the chain, the mechanism is subjected to very little shock, as it is not required to overcome the inertia of a more or less rapidly spinning hand-wheel mass as in prior hand brake mechanisms of the general type illustrated and described. Thus, too, the other advantages heretofore pointed out are attained.

It will be apparent from the foregoing that the invention resides primarily in the provision of an over-running clutch connection between the hand-wheel and the hand-wheel shaft of a hand brake mechanism of the type in which a pawl is employed to hold the mechanism against unwinding rotation during application of the brakes, and as long as it may be desired to maintain the brakes applied, and to stop unwinding rotation of the mechanism during release of the brakes. Accordingly, it will be further apparent that the specific construction of the hand brake mechanism is immaterial so long as it includes the essential elements just mentioned. Therefore, it will be recognized that the specific mechanism illustrated merely is representative of a number of specifically differently constructed mechanisms in which the invention may readily be advantageously embodied.

Any suitable type of overrunning clutch connection may be provided between the hand-wheel 11 and the shaft 10. For example, a pawl may be pivoted to the hand-wheel 11 for cooperation with a ratchet wheel fixed to the shaft 10, or vice-versa. Preferably, however, the overrunning clutch connection employed comprises rolling bodies 21 interposed between the hand-wheel 11 and a hub element 22 fixed to the shaft 10 and with respect to which the hand wheel, which is journaled thereon, is rotatable under the control of said clutch connection. The hand wheel is retained on the hub element 22 between a flange 23 at the rear end of said hub element and the marginal portion of a cap-piece or washer 24 through which a nut 25, which is threaded on the shaft 10, acts to secure the hub element 22 onto a tapered end portion of said shaft 10. In the hub-portion of the hand-wheel 11 are angularly spaced recesses 26 which open through the inner face of said hub portion toward the outer face of the hub element 22 and which, at their inner sides, are closed by said hub element, thereby constituting, between the hub element 22 and the hub portion of the hand-wheel 11, a series of angularly spaced pockets in each of which one of the rolling bodies 21 is disposed.

While the rolling bodies 21 may be of any suitable form such as balls, disks, rollers or the like, they preferably are in the form of rollers as illustrated in the drawings. In any event, the walls defining the outer faces of the recesses 26 are disposed in converging relationship in one direction and in diverging relationship in the opposite direction annularly relative to the outer face of the hub element 22. Consequently, when the hand-wheel 11 is rotated in one direction the rolling bodies 21 become wedged between the face of the hub element 22 and the outer walls of the recesses or spaces 26 and thereby interlock the hand-wheel with the shaft 10 so that said shaft is required to turn with said hand wheel. On the other hand, if the hub element 22 is rotated in the same direction relative to the hand-wheel 11, the rolling bodies tend to move toward the wider ends of the recesses 26 and no clutching action between the hub element 22 and the hand-wheel 11 occurs, with the result that the hand wheel remains disconnected from the hub element. The direction of convergence of the outer faces of the recesses 26 relative to the periphery of the hub element 22 is opposite, of course, to the direction in which the hand-wheel is rotatable to apply the brakes. Consequently, when the hand-wheel is rotated in a direction to apply the brakes the rolling bodies become wedged between the outer face of the hub element 22 and the walls defining the outer faces of the recesses 26 and require rotation of the shaft 10 with the hand-wheel. When rotation of the shaft 10 occurs as a consequent release of brakes, the hand wheel 11 will also revolve or spin, but if during the release revolution of brakes the rotation of the shaft 10 and hub 22 is suddenly stopped as a result of re-engaging the pawl, the wheel will override the shaft and continue to idly revolve about the hub 22 until its momentum subsides.

The outer face of the hub element 22 may be smooth. Preferably, however, it is provided with an annular series of shallow pockets 27 to accommodate the rolling bodies 21. Thus, there is no possibility of slippage between the hand-wheel 11 and the hub element 22 during rotation of the hand-wheel to apply the brakes. On the contrary, the clutching action between the hand-wheel 11 and the hub element 22 during rotation of the hand-wheel to apply the brakes is positive.

Obviously, instead of providing the recesses 26 in the hub portion of the hand-wheel, such recesses may be provided in the peripheral portion of the hub element 22. In other words, the arrangement illustrated and described in this respect obviously may be reversed.

According to the construction illustrated in Fig. 3 of the drawings the walls defining the wider ends of the recesses 26 are formed, adjacent to the hub element 22, with portions 28 extending toward the narrower ends of said recesses so that the rolling bodies 21, when disposed in the wider ends of said recesses, are maintained in non-contacting relationship to the periphery of said hub element 22. However, it may be desirable in some instances to permit the rolling bodies 21 to contact with the periphery of the hub element 22 when said rolling bodies are in the wider ends of the recesses 26, as, for example, to provide a braking or retarding effect to rotation of the hand-wheel in a direction opposite to brake applying rotation thereof when the shaft 10 is stationary. In that case, the portions 28 may be eliminated and the walls defining the wider ends of the recesses 26 may be straight and may be so related to the periphery of the hub element as to cause the rolling bodies 21 to grip lightly between said walls and the periphery of the hub element as a result of retrograde rotation of the hand wheel when the shaft 10 is stationary. This action is so proportioned as to overcome only a limited portion of the inertia of the spinning wheel for the purpose of bringing the wheel more quickly to rest following a release movement of the brake, in effect providing a braking action to check the motion of the spinning wheel. A construction in which the walls defining the wider ends of the recesses 26 are straight and are related to the periphery of the hub element 22, as stated, is shown in Fig. 4 of the drawings.

Without further description it is thought that the features and advantages of the invention will be readily apparent to those skilled in the art, and it will of course be understood that changes in the form, proportion and minor details of construction may be resorted to, without departing from the spirit of the invention and scope of the appended claim.

I claim:

In a hand-brake mechanism, a hand-wheel, a shaft to be rotated by said hand-wheel to apply the brakes, said shaft having a hub fixed with respect thereto and provided with an annular series of peripheral recesses, an annular flange on said hub inwardly of said annular series of recesses, said hand-wheel including a hub portion journaled on said shaft-hub inwardly and outwardly of the annular series of recesses therein for rotation with respect thereto and bearing at its inner end against said flange whereby it is held against inward movement relative to said shaft-hub, a cap-piece fastened to said shaft and overlying the outer end of the hub portion of said hand-wheel whereby the latter is retained on said shaft-hub, the hub portion of said hand-wheel having recesses therein opening through the inner face thereof in alinement with the recesses of said shaft-hub, and rolling bodies in the recesses of said hand-wheel hub portion, the walls defining the outer sides of the recesses in the hub portion of said hand-wheel being disposed in converging relationship, annularly, relative to the periphery of said shaft hub in the direction opposite to which the hand-wheel is rotatable to apply the brakes, said hand-wheel hub portion recesses being of depths at their deeper ends to accommodate said rolling bodies in positions completely outwardly of the periphery of said shaft-hub and being of lesser depths toward their shallower ends such that when the hand-wheel is rotated relative to the shaft hub in a direction to apply the brakes said rolling bodies are urged into the recesses in the shaft-hub and provide positive driving connections between the hand-wheel and said shaft hub.

AUGUSTUS F. KLASING.